(12) United States Patent
Ramarao et al.

(10) Patent No.: US 9,807,550 B2
(45) Date of Patent: Oct. 31, 2017

(54) WEATHER PRESENTATION

(71) Applicant: Yahoo!, Inc., Sunnyvale, CA (US)

(72) Inventors: Prashant Ramarao, Fremont, CA (US); Arunkumar Balasubramanian, Mountain View, CA (US)

(73) Assignee: Yahoo Holdings, Inc., Sunnyvale, CA (US)

( * ) Notice: Subject to any disclaimer, the term of this patent is extended or adjusted under 35 U.S.C. 154(b) by 32 days.

(21) Appl. No.: 14/946,882

(22) Filed: Nov. 20, 2015

(65) Prior Publication Data

US 2017/0150301 A1    May 25, 2017

(51) Int. Cl.
*H04W 24/00*    (2009.01)
*H04W 4/02*    (2009.01)

(52) U.S. Cl.
CPC ..................... *H04W 4/02* (2013.01)

(58) Field of Classification Search
CPC ..................................................... H04W 4/02
USPC ..................................................... 455/456.3
See application file for complete search history.

(56) References Cited

U.S. PATENT DOCUMENTS

| | | | | |
|---|---|---|---|---|
| 7,084,775 B1 * | 8/2006 | Smith | ..................... | G01W 1/00 340/601 |
| 7,275,089 B1 * | 9/2007 | Marshall | ................. | G01W 1/00 702/2 |
| 8,599,013 B1 * | 12/2013 | Baron, Sr. | ............. | H04W 4/021 340/539.1 |
| 2003/0107490 A1 * | 6/2003 | Sznaider | ................ | G08B 21/10 340/601 |
| 2004/0181340 A1 * | 9/2004 | Smith | ..................... | G08B 21/10 702/3 |
| 2005/0192724 A1 * | 9/2005 | Hendry | .............. | B60H 1/00771 701/36 |
| 2015/0181382 A1 * | 6/2015 | McDonald | .............. | H04L 67/18 455/456.3 |

* cited by examiner

*Primary Examiner* — William Nealon
(74) *Attorney, Agent, or Firm* — Cooper Legal Group, LLC

(57) ABSTRACT

Among other things, one or more client devices, techniques, and/or systems are provided for presenting weather conditions. A grid size of a first geohash cell (e.g., space subdivided into a grid), corresponding to a location of a user, is determined based upon supplemental factors (e.g., population density, elevation, topography, etc.). A first weather station, located in the first geohash cell, and a second weather station, located in a second geohash cell neighboring the first geohash cell, are identified. A first distance from the first weather station to the location is determined, and a second distance from the second weather station to the location is determined. Responsive to the first distance being less than the second distance, information from the first weather station is presented to the user. Responsive to the second distance being less than the first distance, information from the second weather station is presented to the user.

20 Claims, 9 Drawing Sheets

WEATHER PRESENTATION

BACKGROUND

Service providers may desire to present users with more accurate weather information. Presenting more accurate weather information may be based upon identifying a location of a user relative to a weather station providing the weather information. In an example, the user may be located in an area served by a first weather station. However, the first weather station may not be a relatively closer weather station to the location of the user in relation to other nearby weather stations and/or may not provide relatively more accurate weather information than other nearby weather stations. Thus, a service provider may provide users with relatively less accurate weather information from such a weather station.

SUMMARY

In accordance with the present disclosure, one or more client devices, systems, and/or methods for weather presentation are provided. Weather information may be presented from a weather station that is relatively closer and/or that provides relatively more accurate weather information than other weather stations proximate a user. In an example, a first geohash cell (e.g., a subdivided area of space within a grid), corresponding to a location (e.g., longitude and latitude coordinates) of a user of a client device, may be identified. A grid size of the first geohash cell may be determined. The grid size may be based upon supplemental factors of the location (e.g., a population density of the location, a topography of the location, an elevation of the location, etc.). For example, a more densely populated location may be determined to have a smaller grid size, and a less densely populated location may be determined to have a larger grid size. A second geohash cell and/or one or more additional geohash cells that neighbor the first geohash cell may be identified.

In an example, responsive to the second geohash cell not comprising the second weather station and a third geohash cell, neighboring the second geohash cell (e.g., not neighboring the first geohash cell), comprising a fourth weather station, the fourth weather station may be added to the weather database. In an example, responsive to the third geohash cell not comprising the fourth weather station and a fourth geohash cell, neighboring the third geohash cell (e.g., not neighboring the third geohash cell), comprising a fifth weather station, the fifth weather station may be added to the weather database. In this way, one or more geohash cells may be searched until a geohash cell containing a weather station is identified.

A first weather station located in the first geohash cell may be identified. First weather metadata associated with the first weather station (e.g., a name of the first weather station, a current temperature, a current weather condition, a station location of the first weather station) may be identified. In an example, one or more additional weather stations may be located in the first geohash cell (e.g., a third weather station). A second weather station located in the second geohash cell may be identified. In an example, one or more additional second cell weather stations may be located in the second geohash cell. Second weather metadata associated with the second weather station (e.g., a second name of the second weather station, a current temperature, a current weather condition, a second station location of the second weather station) may be identified.

A first distance (e.g., 5 miles) from the first weather station to the location may be calculated based upon the first weather metadata. The first distance may be calculated utilizing a vertical distance and a horizontal distance from the first weather station to the location (e.g., utilizing topography data about the location and/or the station location, elevation data about the location and/or the station location, etc.). A second distance (e.g., 10 miles) from the second weather station to the location may be calculated based upon the second weather metadata. The second distance may be calculated utilizing a second vertical distance and a second horizontal distance from the second weather station to the location (e.g., utilizing topography data about the location and/or the second station location, elevation data about the location and/or the second station location, etc.).

Responsive to the first distance being less than the second distance, information from the first weather station may be presented to the user. Responsive to the second distance being less than the first distance, information from the second weather station may be presented to the user. In an example, quality metrics of the first weather station and the second weather station (e.g., how historically accurate a weather station predicts the weather) may be used to determine whether to provide information from the first weather station or the second weather station.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
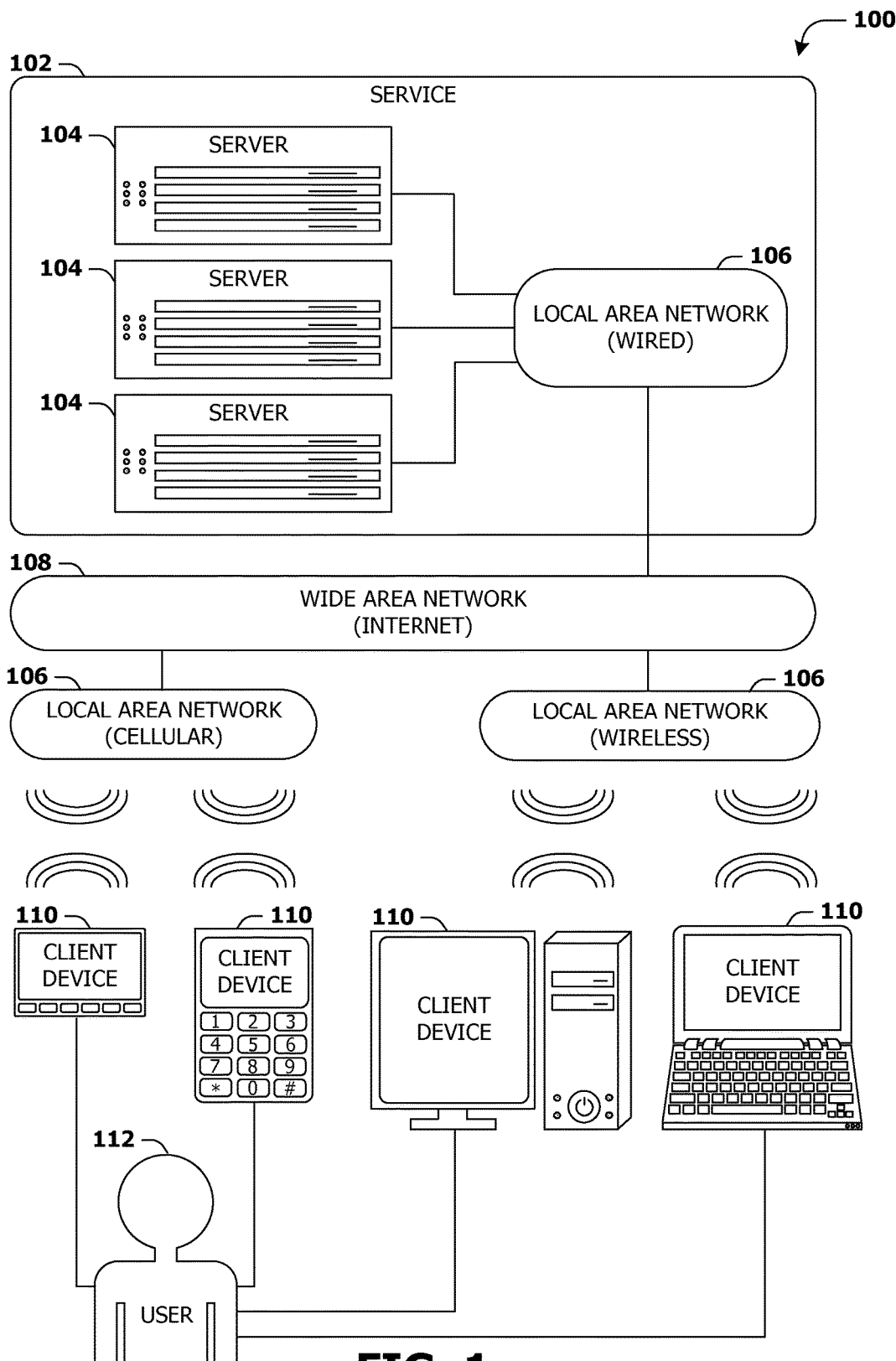
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
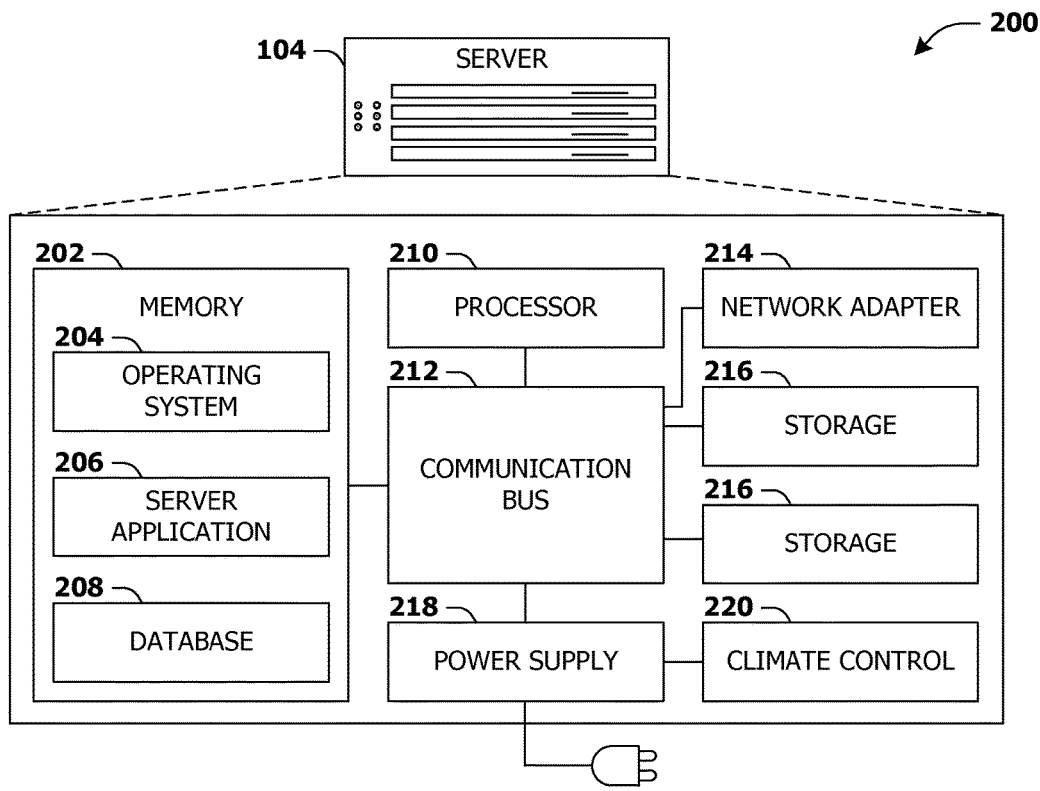
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectable to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
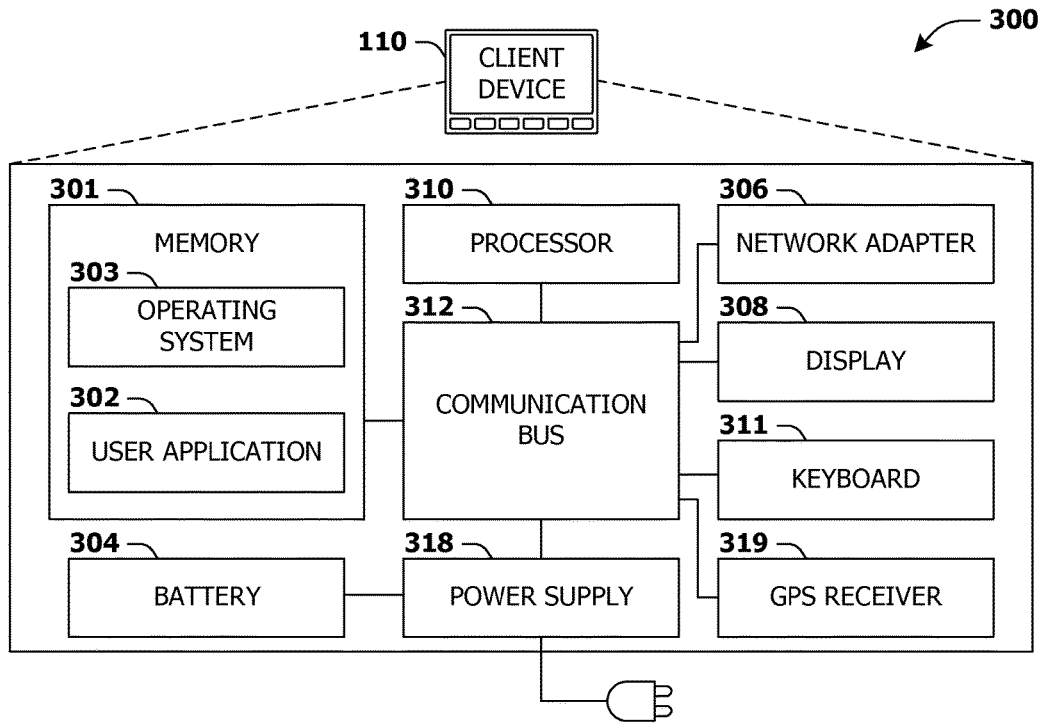
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectable to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more client devices, systems, and/or techniques for weather presentation are provided. A user of a client device (e.g., a smart phone, a wearable device, smart glasses, a smart watch, etc.) may desire to determine a weather condition and/or a weather forecast for a location. In an example, the location may be represented by longitude and longitude coordinates (e.g., 41.4822° N, 81.6697° W). A first geohash cell corresponding to the location may be identified. A grid size of the first geohash cell (e.g., a 10 mile by 12 mile rectangle, an irregular shape, a circular shape, etc.) may be determined based upon a population density of the location, an elevation of the location, a topography of the location etc. In an example, the grid size may be smaller based upon the location being in a mountainous region, or larger based upon the location being in a relatively flat region. One or more additional geohash cells (e.g., a second geohash cell) neighboring the first geohash cell may be identified.

A first weather station, and first weather metadata (e.g., a name of the first weather station, a current temperature, a current weather condition, a station location of the first weather station), located in the first geohash cell may be identified. A second weather station, and second weather metadata (e.g., a second name of the second weather station, the current temperature, the current weather condition, a second station location of the second weather station), located in the second geohash cell may be identified. One or more additional weather stations, and associated weather metadata, located in the one or more additional geohash cells neighboring the first geohash cell, may be identified.

Distances from the location of the user to the first weather station, the second weather station, and/or the one or more additional weather station may be calculated. A weather station (e.g., the first weather station) nearest the location of the user (e.g., utilizing vertical and horizontal distance) may be identified. A first quality metric of the first weather station may be determined. Responsive to the first weather station being nearest the location and the first quality metric exceeding a quality metric threshold, information from the first weather station may be presented to the user. However, if the first quality metric is less than a second quality metric of the second weather station by a certain degree, information from the second weather station (e.g., where the second weather station is a next nearest weather station) may be presented to the user because such information may be relatively more accurate than information provided by the first weather station.

The ability to identify a weather station having a relatively higher quality metric (e.g., an airport weather service may be deemed to have a higher quality metric than a high school student run weather service) and/or being relatively closer to the user than other weather stations may provide for relatively more accurate weather conditions and/or weather forecasts to be identified for a user. For example, the location may comprise a lakefront region of a lake. The first weather station may be in the first geohash cell corresponding to the location, but may be located relatively inland from the lake. The second weather station, located in the second geohash cell, may be nearer to the location and located near the lakefront region of the lake. Thus, information from the second weather station may be presented to the user. The information from the second weather station may be relatively more accurate and/or relevant to the user.

Figure 4:
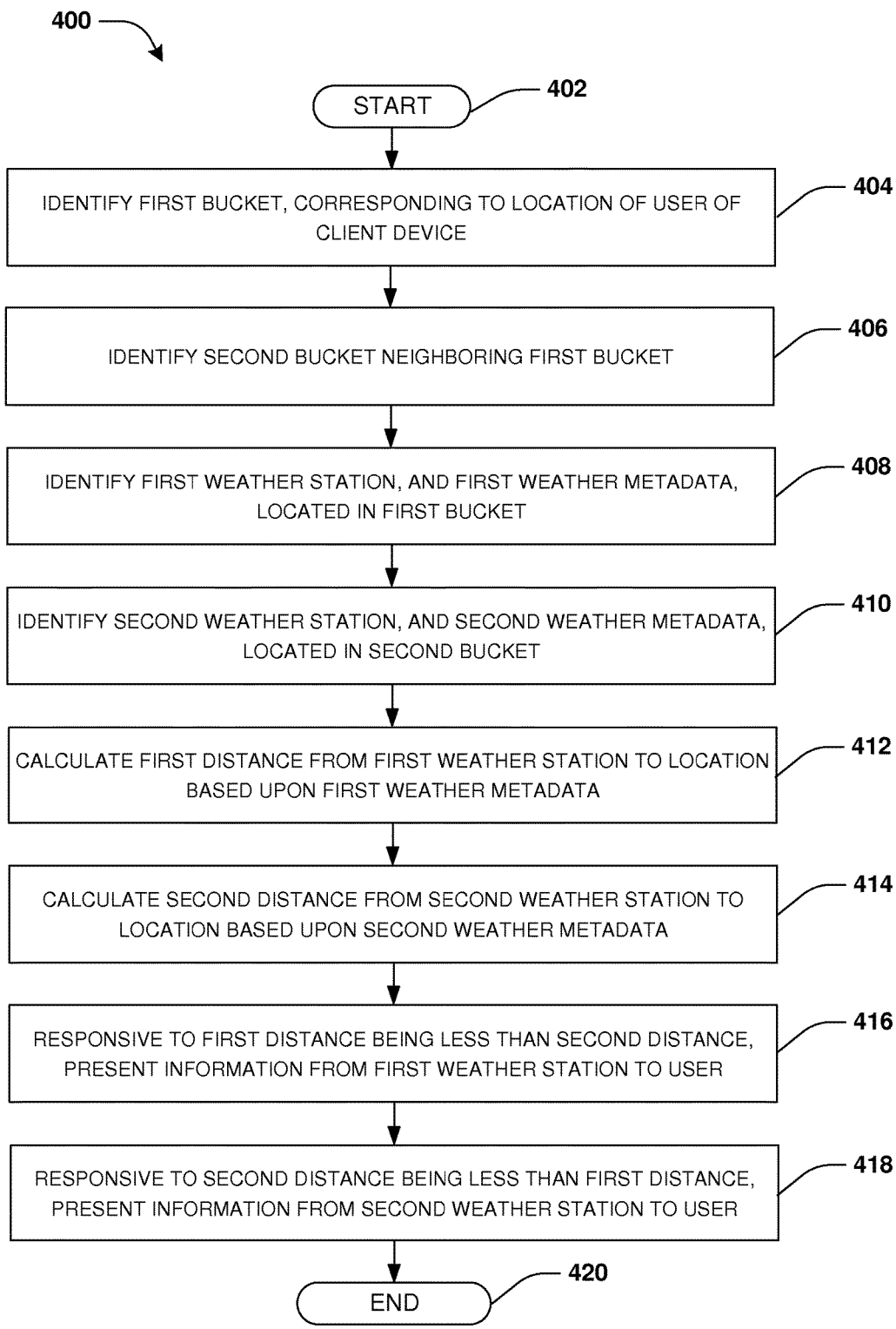
FIG. 4 is a flow chart illustrating an example method of weather presentation.

An embodiment of weather presentation is illustrated by an example method 400 of FIG. 4. At 402, the method 400 starts. At 404, a first geohash cell (e.g., a first geohash), corresponding to a location (e.g., represented by longitude and latitude coordinates) of a user of a client device, may be identified. A grid size of the first geohash cell may be determined based upon supplemental factors of the location. The supplemental factors may comprise a population density of the location, an elevation of the location, a topography of the location, etc. For example, the location having a higher elevation and a lower population density may have a smaller grid size compared to a second location having a lower elevation and a higher population density.

At 406, a second geohash cell (e.g., a second geohash), neighboring the first geohash cell, may be identified. One or more additional geohash cells neighboring the first geohash cell (e.g., nine geohash cells or some other number of geohash cells) may be identified. In an example, the second geohash cell and/or the one or more additional geohash cells may surround the first geohash cell. In another example, responsive to the second geohash cell not comprising the second weather station and a third geohash cell, neighboring the second geohash cell (e.g., not neighboring the first geohash cell), comprising a fourth weather station, the fourth weather station may be added to the weather database. In an example, responsive to the third geohash cell not comprising the fourth weather station and a fourth geohash cell, neighboring the third geohash cell (e.g., not neighboring the third geohash cell), comprising a fifth weather station, the fifth weather station may be added to the weather database. One or more geohash cells may be searched until a geohash cell containing a weather station is identified.

At 408, a first weather station, and first weather metadata, located within the first geohash cell may be identified. The first weather metadata may comprise a name of the first weather station, a current temperature, a current weather condition, a forecasted weather condition, a station location of the first weather station (e.g., represented by first weather longitude and latitude coordinates). A first quality metric of the first weather station may be determined. The first quality metric may comprise a percentage of how often information from the first weather station was correct. For example, the forecasted weather condition presented by the first weather station may be correct 42% of the time. In an example, a quality metric threshold may be based upon a percentage of correct forecasts. The quality metric threshold may comprise a correct forecasted weather condition 60% of the time. The first quality metric may comprise the first weather station as a whole, or the first weather station relative to the location (e.g., the first weather station may be accurate 70% of the time for an average weather condition within the first geohash cell, but accurate merely 30% of the time for the location).

At 410, a second weather station, and second weather metadata, located within the second geohash cell may be identified. The second weather metadata may comprise a second name of the second weather station, the current temperature, the current weather condition, the forecasted weather condition, a second station location of the second weather station (e.g., represented by second weather longitude and latitude coordinates). A second quality metric of the second weather station may be determined. A weather database may comprise one or more weather stations located within the first geohash cell, the second geohash cell, and/or the one or more additional geohash cells. Responsive to a low quality weather station having a quality metric below the quality metric threshold, the low quality weather station may be removed from the weather database. In an example, a search for one or more weather stations within the first geohash cell, the second geohash cell, and/or the one or more additional geohash cells may be performed. Weather stations, and corresponding weather metadata, from the one or more weather stations may be dynamically added to the weather database. The weather database may store the one or more weather stations, and corresponding weather metadata, based upon the geohash cell within which the weather station is located. For example, the weather database may comprise the first weather station, a sixth weather station, and a seventh weather station linked to the first geohash cell (e.g., where the first weather station, the sixth weather station, and the seventh weather station are located in the first geohash cell), the second weather station and an eighth weather station linked to the second geohash cell (e.g., where the second weather station and the eighth weather station are located in the second geohash cell), etc.

In an example, a map of geohash cells may be generated by identifying the one or more weather stations located within a threshold proximity to each other (e.g., 20 miles or some other distance). One or more station locations of the one or more weather stations may be stored in the weather database. The one or more weather stations may be associated with the first geohash cell in which the weather station is located. The first geohash cell in which the weather station is located may comprise a search key. In an example, responsive to identifying the first geohash cell as containing the location of the user, the first geohash cell may be used as a search term to identify one or more weather stations located in the first geohash cell. Additionally, the one or more additional geohash cells neighboring the first geohash cell may be used as search terms to identify additional weather stations, located with the one or more additional geohash cells.

At 412, a first distance from the first weather station to the location may be calculated based upon the first weather metadata. For example, longitude and latitude coordinates of the location and longitude and latitude coordinates of the first weather station (e.g., from the first weather metadata) may be utilized to determine the first distance. In an example, elevation data may be utilized to calculate a vertical distance from the first weather station to the location. For example, if a horizontal distance is 4 miles and the vertical distance is 3 miles, then the first distance may be 5 miles.

At 414, a second distance from the second weather station to the location may be calculated based upon the second weather metadata. For example, the longitude and latitude coordinates of the location and longitude and latitude coordinates of the second weather station (e.g., from the second weather metadata) may be utilized to determine the second distance. In an example, elevation data may be utilized to calculate a vertical distance from the second weather station to the location, such that the second distance is determined utilizing the vertical distance and a horizontal distance between the second weather station and the location.

At 416, responsive to the first distance being less than the second distance, weather information from the first weather station may be presented to the user. In an example, responsive to the first weather station having the first quality metric below the quality metric threshold, weather information from the second weather station may be presented to the user (e.g., where the second weather station is a second nearest weather station to the user). In another example, responsive to the first weather station having the first quality metric exceeding the second quality metric of the second weather station, weather information from the first weather station may be presented to the user. At 418, responsive to the second distance being less than the first distance, weather information from the second weather station may be presented to the user. In an example, responsive to the second weather station having the second quality metric exceeding the first quality metric, weather information from the second weather station may be presented to the user. In this way, relative proximity of a weather station to a location of a user and/or a quality of weather information provided by the weather station may be used to determine whether to provide information from the weather station to the user. In an example, the first weather station and the second weather station may have different weather station providers. In an example, the weather database may comprise one or more weather stations from one or more weather station providers. Thus, the user may be presented with more relevant information from a closer and/or more accurate weather station independent of the weather provider that provides the weather station.

In another example, responsive to the first geohash cell and the second geohash cell lacking a weather station, the fourth weather station, and fourth weather station metadata, and/or the fifth weather station, and fifth weather station metadata, may be identified. A third distance from the fourth weather station to the location may be calculated based upon the fourth weather station metadata and/or a fourth distance from the fifth weather station to the location may be calculated based upon the fifth weather station metadata. In an example, responsive to the third distance being less than one or more other distances of one or more other weather stations, information may be presented from the fourth weather station to the user. In an example, responsive to the fourth distance being less than the one or more other distances of the one or more other weather stations, information may be presented from the fifth weather station to the user. At 420, the method 400 ends.

Figure 5A:
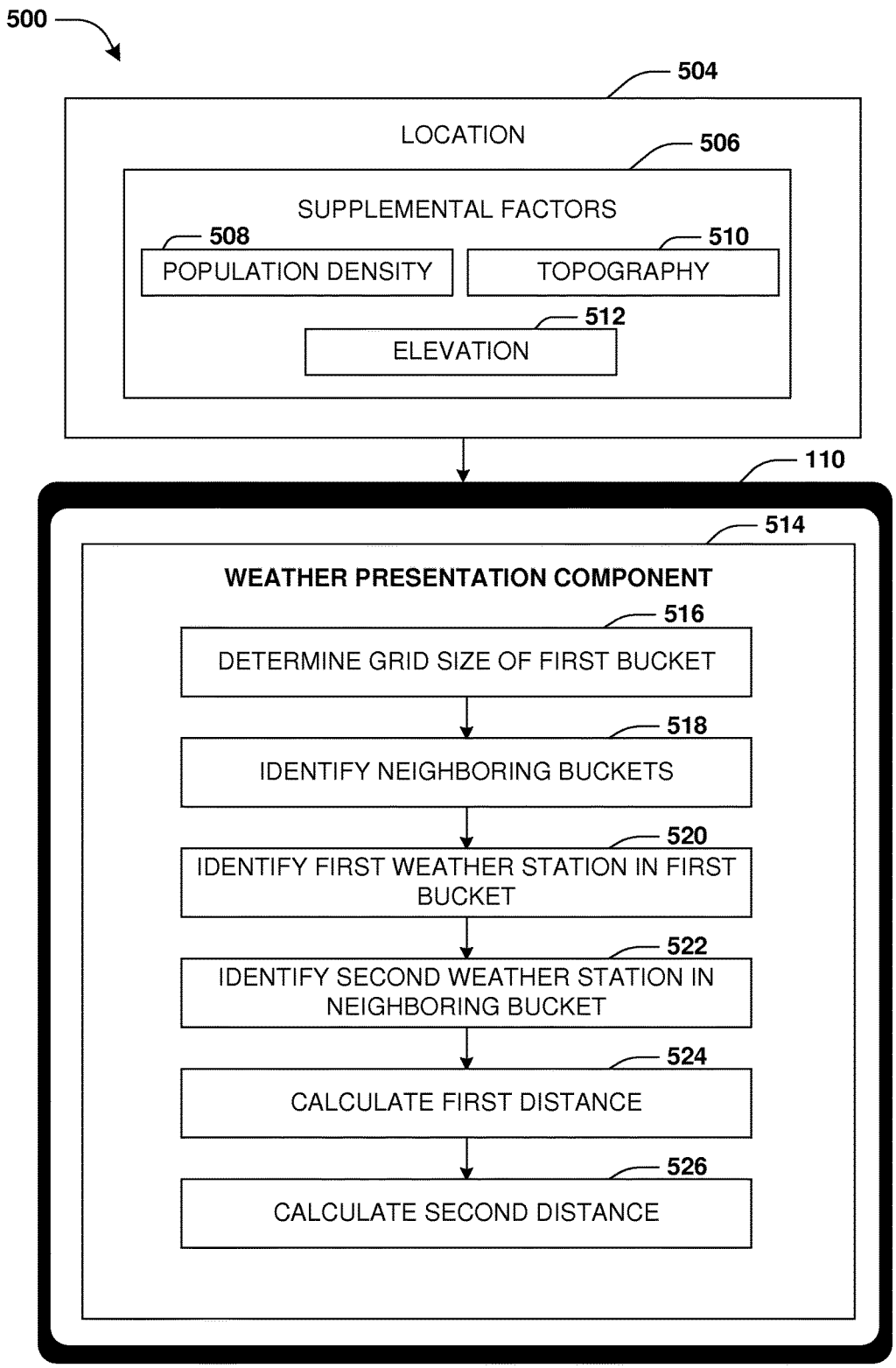
FIG. 5A is a component block diagram illustrating an example system for weather presentation, where a location of a user is identified.
Figure 5B:
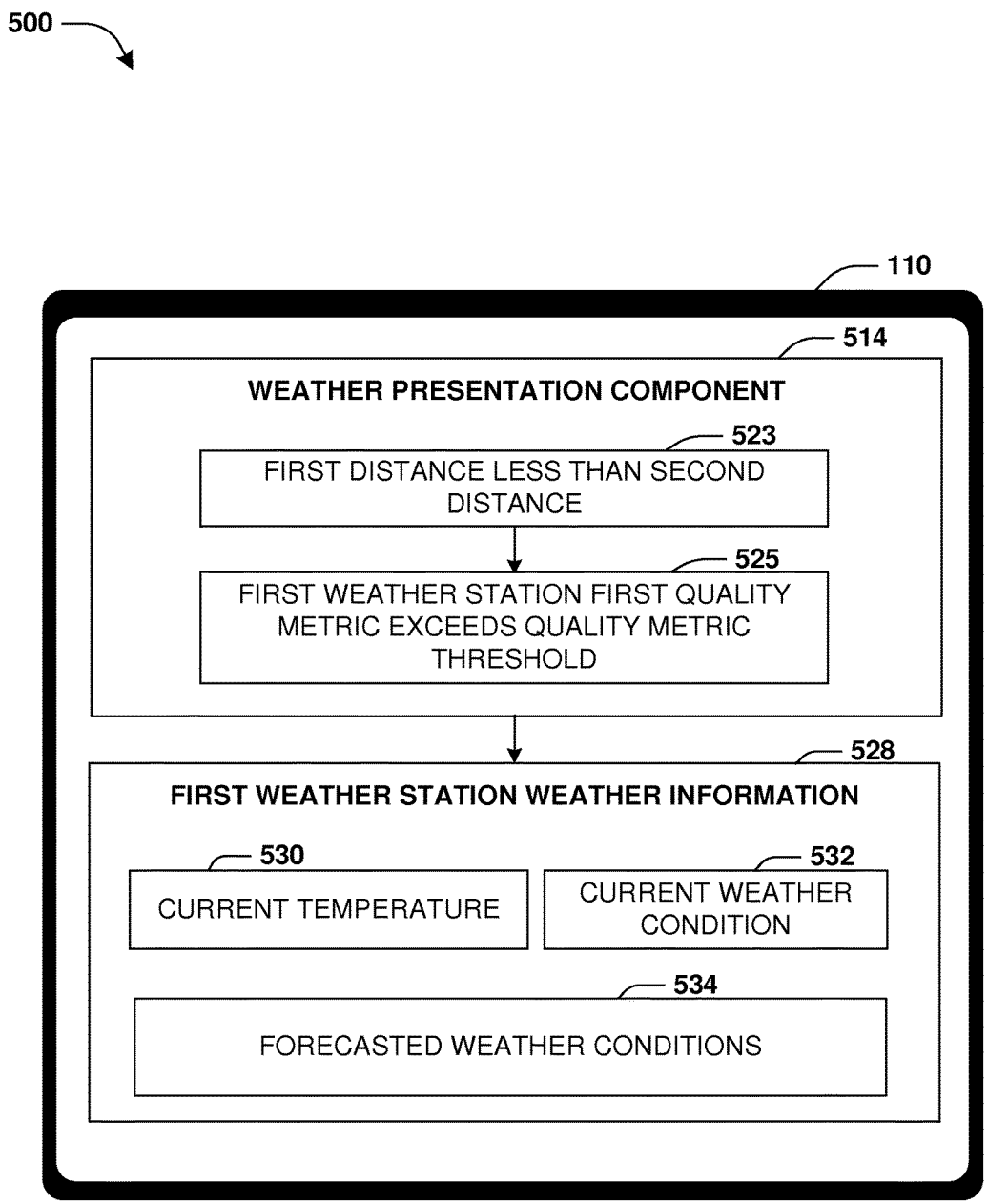
FIG. 5B is a component block diagram illustrating an example system for weather presentation, where a first weather station is closer a user than a second weather station.
Figure 5C:
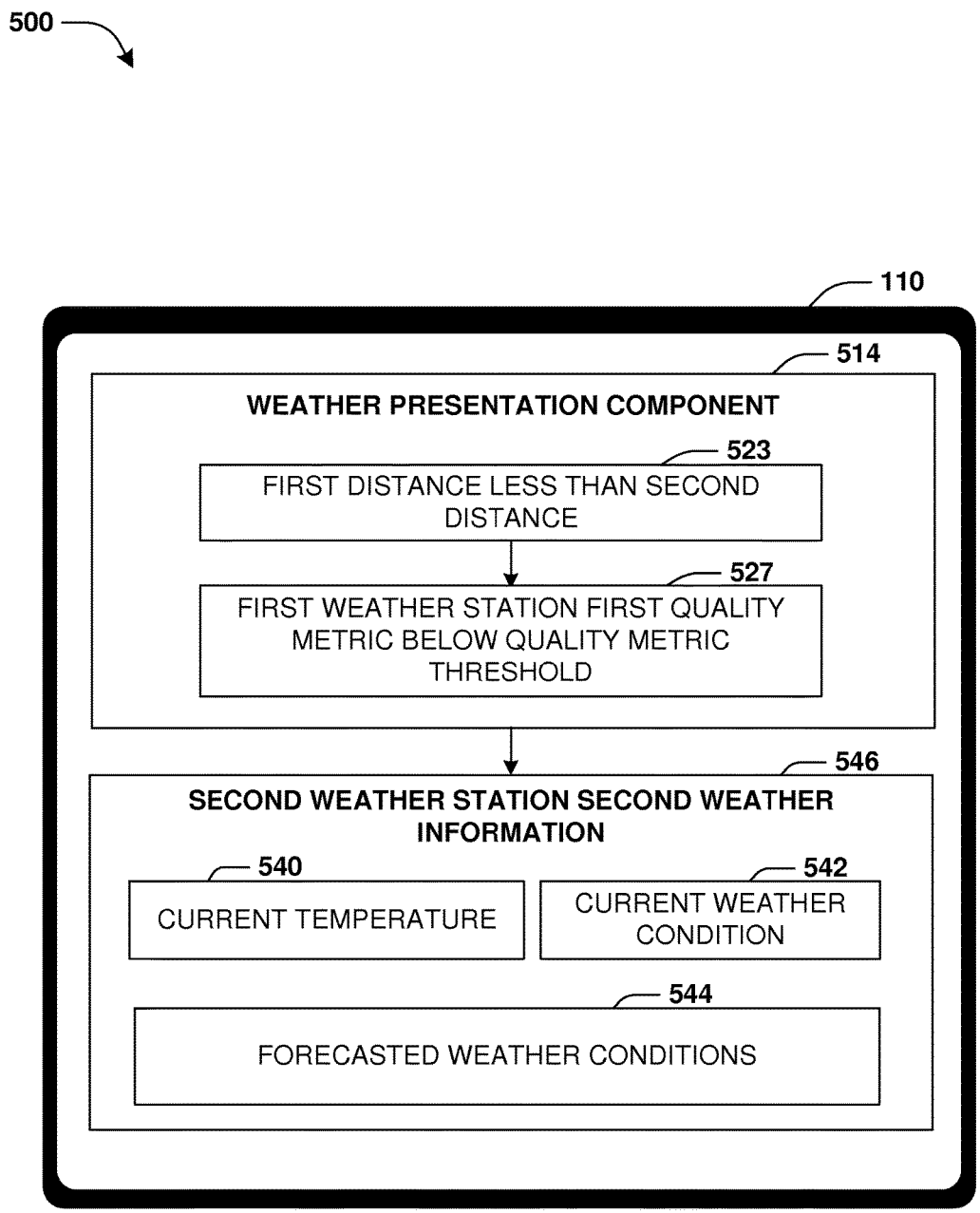
FIG. 5C is a component block diagram illustrating an example system for weather presentation, where a first weather station has a first quality metric below a quality metric threshold.

FIGS. 5A-5C illustrates an example system 500 for weather presentation utilizing a weather presentation component 514. A location 504, of a user of a client device 110 (e.g., a smartphone, a wearable device, a smart device, etc.), may be identified by the weather presentation component 514. The location 504 may comprise a current location of the user or a location of interest of the user (e.g., a location to which the user will be traveling). Supplemental factors 506, such as a population density 508, a topography 510, an elevation 512, etc. of the location 504 may be identified. The weather presentation component 514 may determine a grid size 516 of a first geohash cell based upon the supplemental factors 506. The weather presentation component 514 may identify one or more additional geohash cells (e.g., a second geohash cell) neighboring the first geohash cell. The weather presentation component 514 may identify a first weather station 520 located in the first geohash cell. The weather presentation component 514 may identify first weather metadata (e.g., a name of the first weather station, a station location of the first weather station, etc.) associated with the first weather station 520. The weather presentation component 514 may identify a second weather station 522 located in the second geohash cell. The weather presentation component 514 may identify second weather metadata (e.g., a second name of the second weather station, a second station location of the second weather station, etc.) associated with the second weather station 522. The weather presentation component 514 may calculate a first distance 524 between the station location and the location 504. The weather presentation component 514 may calculate a second distance 526 between the second station location and the location 504.

FIG. 5B illustrates the weather presentation component 514 presenting weather information from the first weather station 520. Responsive to the first distance 524 being less than 523 the second distance 526 and a first quality metric exceeding 525 a quality metric threshold, weather information 528 from the first weather station 520 may be presented on the client device 110. The weather information 528 may comprise a current temperature 530, a current weather condition 532, and/or a forecasted weather condition 534 at the location 504.

FIG. 5C illustrates the weather presentation component 514 presenting weather information from the second weather station 522. Responsive to the first distance 524 being less than 523 the second distance 526 and the first quality metric being below 527 the quality metric threshold, second weather information 546 from the second weather station 522 may be presented on the client device 110. The second weather information 546 may comprise a current temperature 540, a current weather condition 542, and/or a forecasted weather condition 544 at the location 504, as determined by the second weather station 522 at the second station location.

Figure 6A:
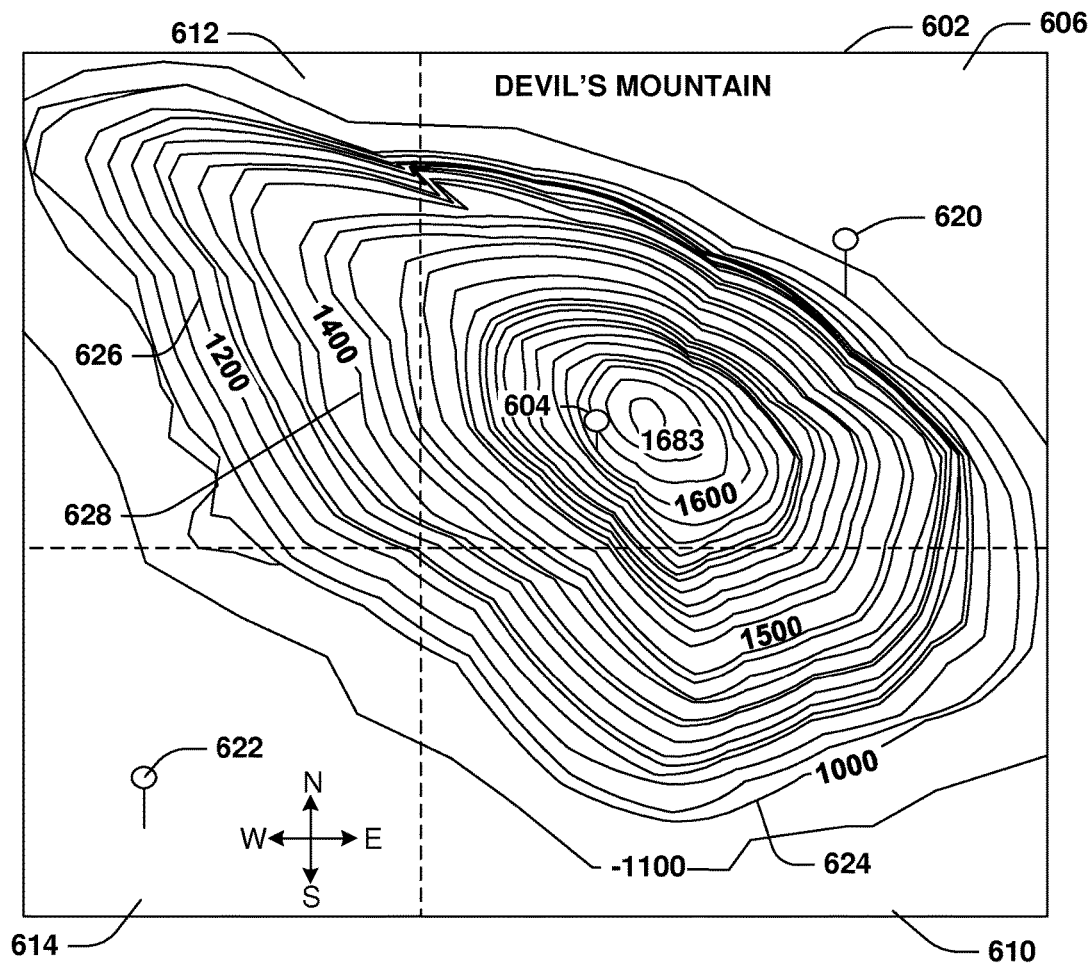
FIG. 6A is a topographical map depicting a location of a user, a station location of a first weather station, and a second weather station location of a second weather station.
Figure 6B:
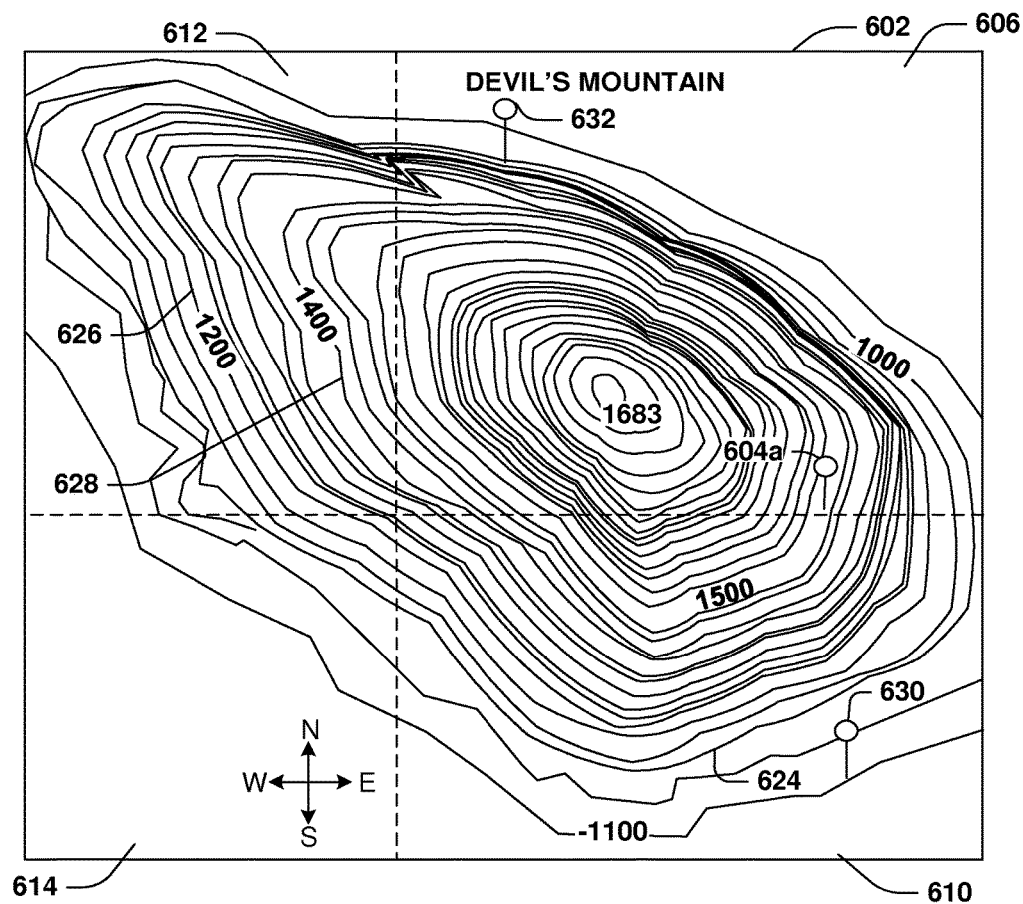
FIG. 6B is a topographical map depicting a second location of a user, a station location of a first weather station, and a second weather station location of a second weather station.

FIGS. 6A-6B illustrate a topographical map 602 depicting a location 604 of a user. The topographical map 602 may depict devil's mountain, where lines represent elevations. For example, a first line 624 may correspond to an elevation of 1000 feet above sea level, a second line 626 may correspond to 1200 feet above sea level, a third line 628 may correspond to 1400 feet above sea level, etc. The topographical map 602 may be divided into four geohash cells, a first geohash cell 606, a second geohash cell 610, a third geohash cell 612, and a fourth geohash cell 614 (e.g., space divided into a grid). The location 604 of the user may be identified (e.g., near a top of devil's mountain) in the first geohash cell 606. The location 604 may be located on a south-west face of devil's mountain. The location 604 may be at an elevation of 1600 feet above sea level. A station location 620 of a first weather station may be identified in the first geohash cell 606 on a north-east face of devil's mountain. The station location 620 may be at an elevation of 1000 feet above sea level. A second station location 622 of a second weather station may be identified in the fourth geohash cell 614 on a south-west side of devil's mountain. The second station location 622 may be at an elevation of 0 feet above sea level.

In an example, a first distance between the location 604 and the station location 620 may be calculated. A second distance between the location 604 and the second station location 622 may be calculated. The first distance (e.g., comprising a vertical and horizontal distance) may be less than the second distance. However, based upon the topography of devil's mountain, the second weather station may be selected to present weather information to the user. For example, responsive to a peak of devil's mountain being between the location 604 and the station location 620, the weather information from the second weather station may be presented to the user as devil's mountain may act as a barrier, and weather on the east side of devil's mountain may be significantly different than weather on the west side of devil's mountain.

FIG. 6B illustrates the topographical map 602 depicting a second location 604a of the user. The second location 604a of the user may be identified in the first geohash cell 606. The second location 604a may be located on an eastern face of devil's mountain. The second location 604a may be at an elevation of 1500 feet above sea level. A third station location 632 of a third weather station may be identified in the first geohash cell 606 on a northern face of devil's mountain. The third station location 632 may be at an elevation of 1000 feet above sea level. A fourth station location 630 of a fourth weather station may be identified in the second geohash cell 610 on a south-east side of devil's mountain. The fourth station location 630 may be at an elevation of −1100 feet above sea level.

In an example, a third distance between the second location 604a and the third station location 632 may be calculated. A fourth distance between the second location 604a and the fourth station location 630 may be calculated. The third distance (e.g., comprising a vertical and horizontal distance) may exceed the fourth distance. The fourth station location 630 may be a horizontal distance from the second location 604a that is less than a second horizontal distance between the second location 604a and the third station location 630. However, based upon the vertical distance (e.g., the second location 604a may be 1600 feet higher than the third station location 630), information from the fourth weather station may be presented to the user.

Figure 7:
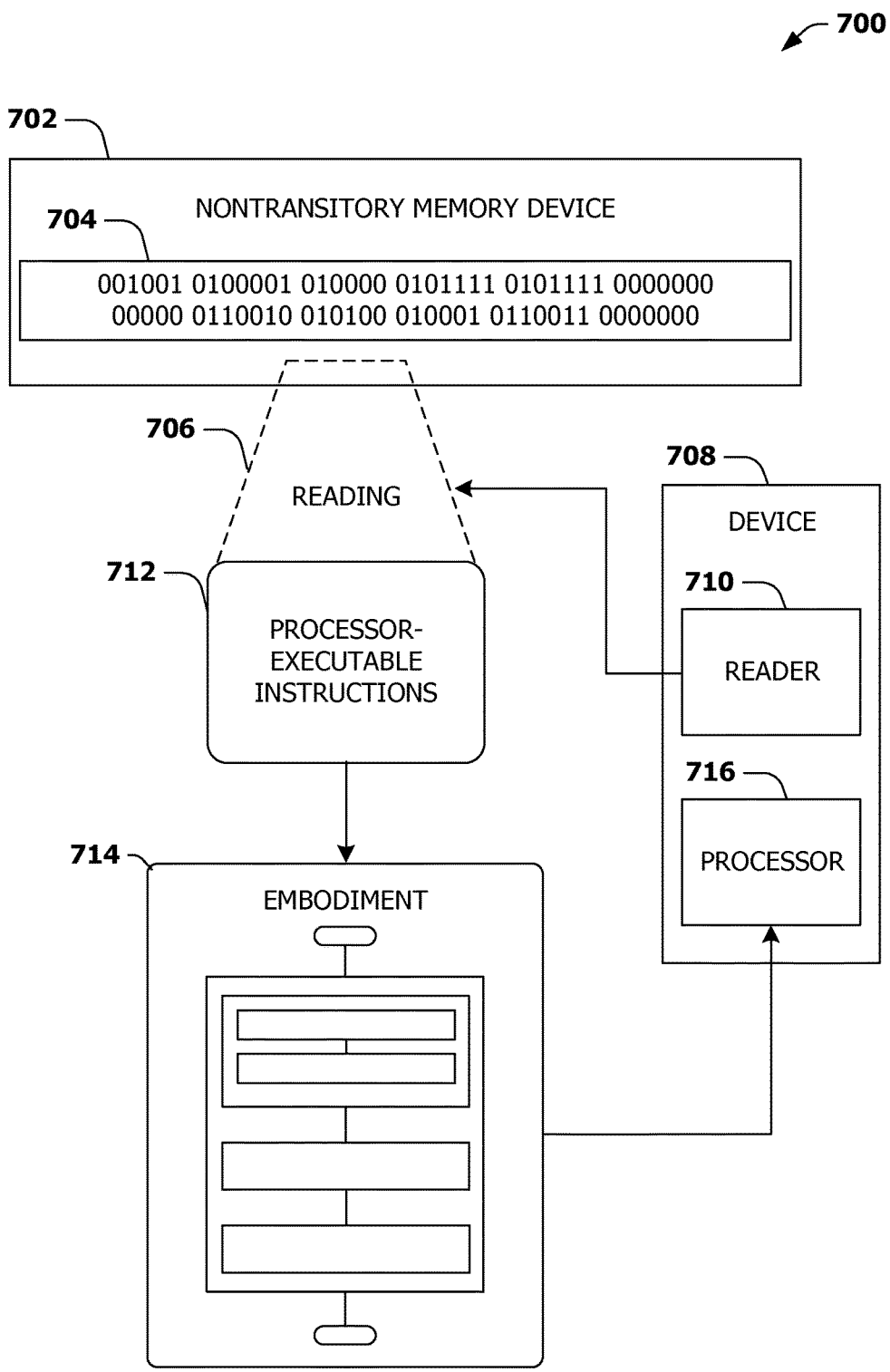
FIG. 7 is an illustration of a scenario featuring an example nontransitory memory device in accordance with one or more of the provisions set forth herein.

FIG. 7 is an illustration of a scenario 700 involving an example nontransitory memory device 702. The nontransitory memory device 702 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random-dom access memory (SDRAM) technologies), a platter of a hard disk drive, a flash memory device, or a magnetic or optical disc (such as a CD, DVD, or floppy disk). The example nontransitory memory device 702 stores computer-readable data 704 that, when subjected to reading 706 by a reader 710 of a device 708 (e.g., a read head of a hard disk drive, or a read operation invoked on a solid-state storage device), express processor-executable instructions 712. In some embodiments, the processor-executable instructions, when executed on a processor 716 of the device 708, are configured to perform a method, such as at least some of the example 400 of FIG. 4, for example. In some embodiments, the processor-executable instructions, when executed on the processor 716 of the device 708, are configured to implement a system, such as at least some of the example system 500 of FIGS. 5A-5C, and/or at least some of the example system 600 of FIGS. 6A-6B, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method of weather presentation comprising:
   identifying a first geohash cell corresponding to a location of a user of a client device;
   identifying a second geohash cell neighboring the first geohash cell;
   identifying a first weather station, and first weather metadata, located in the first geohash cell;
   identifying a second weather station, and second weather metadata, located in the second geohash cell;
   calculating a first distance from the first weather station to the location based upon the first weather metadata;
   calculating a second distance from the second weather station to the location based upon the second weather metadata;
   responsive to the first distance being less than the second distance, presenting information from the first weather station to the user;
   responsive to the second distance being less than the first distance, presenting information from the second weather station to the user; and
   at least one of:
      responsive to the first weather station having a first quality metric below a quality metric threshold, removing the first weather station from a weather database; or
      responsive to a third weather station, located in the first geohash cell, having a third quality metric exceeding the quality metric threshold, adding the third weather station to the weather database, the weather database comprising one or more weather stations available for providing information to present to the user.

2. The method of claim 1, the first weather metadata comprising at least one of a name of the first weather station, a current temperature, a current weather condition, or a station location of the first weather station.

3. The method of claim 1, the location represented by longitude and latitude coordinates.

4. The method of claim 1, comprising:
   determining at least one of the first distance or the second distance utilizing at least one of topography data about the location or elevation data about the location.

5. The method of claim 1, comprising:
   responsive to the first weather station having the first quality metric exceeding a second quality metric of the second weather station, presenting weather information from the first weather station to the user.

6. The method of claim 1, comprising:
   determining a grid size of the first geohash cell, corresponding to the location, based upon supplemental factors of the location.

7. The method of claim 6, the supplemental factors comprising at least one of a population density of the location, a topography of the location, or an elevation of the location.

8. The method of claim 1, the calculating a first distance comprising calculating vertical distance and horizontal distance from the first weather station to the location, and the calculating a second distance comprising calculating vertical distance and horizontal distance from the second weather station to the location.

9. The method of claim 6, the supplemental factors comprising a population density of the location.

10. The method of claim 1, comprising:
    responsive to the second geohash cell not comprising the second weather station and a third geohash cell, neighboring the second geohash cell, comprising a fourth weather station:
       adding the fourth weather station to the weather database;
       identifying the fourth weather station and fourth weather station metadata;
       calculating a third distance from the fourth weather station to the location based upon the fourth weather station metadata; and
       responsive to the third distance being less than one or more other distances of one or more other weather stations, presenting information from the fourth weather station to the user; and
    responsive to the third geohash cell not comprising the fourth weather station and a fourth geohash cell, neighboring the third geohash cell, comprising a fifth weather station:
       adding the fifth weather station to the weather database;

identifying the fifth weather station and fifth weather station metadata;

calculating a fourth distance from the fifth weather station to the location based upon the fifth weather station metadata; and responsive to the fourth distance being less than the one or more other distances of the one or more other weather stations, presenting information from the fifth weather station to the user.

11. A client device for weather presentation, the client device comprising:

a processor;

a display; and a memory storing instructions that, when executed on the processor, implement a weather presentation component configured to:

identify a first geohash cell corresponding to a location of a user of a client device;

identify a second geohash cell neighboring the first geohash cell;

identify a first weather station, and first weather metadata, located in the first geohash cell;

identify a second weather station, and second weather metadata, located in the second geohash cell;

calculate a first distance from the first weather station to the location based upon the first weather metadata;

calculate a second distance from the second weather station to the location based upon the second weather metadata;

responsive to the first distance being less than the second distance, present weather information from the first weather station to the user;

responsive to the second distance being less than the first distance, present weather information from the second weather station to the user; and responsive to a third weather station, located in the first geohash cell, having a third quality metric exceeding a quality metric threshold, add the third weather station, associated with the first geohash cell, to a weather database, the weather database comprising one or more weather stations available for providing information to present to the user.

12. The client device of claim 11, the first weather metadata comprising at least one of a name of the first weather station, a current temperature, a current weather condition, a forecasted weather condition, or a station location of the first weather station.

13. The client device of claim 11, the location represented by longitude and latitude coordinates.

14. The client device of claim 11, the weather presentation component configured to:

determine at least one of the first distance or the second distance utilizing at least one of topography data about the location or elevation data about the location.

15. The client device of claim 11, the weather presentation component configured to:

responsive to the first weather station having a first quality metric exceeding a second quality metric of the second weather station, present weather information from the first weather station to the user.

16. The client device of claim 11, the weather presentation component configured to:

determine a grid size of the first geohash cell based upon supplemental factors comprising at least one of a population density of the location, a topography of the location, or an elevation of the location.

17. The client device of claim 11, the weather presentation component configured to:

calculate the first distance by calculating vertical distance and horizontal distance from the first weather station to the location; and calculate the second distance by calculating vertical distance and horizontal distance from the second weather station to the location.

18. The client device of claim 11, the weather presentation component configured to:

responsive to the first weather station having a first quality metric below the quality metric threshold, remove the first weather station from the weather database.

19. The client device of claim 11, the weather presentation component configured to:

determine a grid size of the first geohash cell.

20. A non-transitory computer readable medium comprising instructions which when executed perform a method for weather presentation, comprising:

identifying a first geohash cell corresponding to a location of a user of a client device;

identifying a second geohash cell neighboring the first geohash cell;

identifying a first weather station, and first weather metadata, located in the first geohash cell;

identifying a second weather station, and second weather metadata, located in the second geohash cell;

calculating a first distance from the first weather station to the location based upon the first weather metadata;

calculating a second distance from the second weather station to the location based upon the second weather metadata;

responsive to the first distance being less than the second distance, presenting information from the first weather station to the user; and responsive to the first weather station having a first quality metric below a quality metric threshold, removing the first weather station from a weather database, the weather database comprising one or more weather stations available for providing information to present to the user.

* * * * *